United States Patent

Hays et al.

[11] Patent Number: 5,974,643
[45] Date of Patent: Nov. 2, 1999

[54] PROGRAMMABLE VISION-GUIDED ROBOTIC TURRET-MOUNTED TOOLS

[75] Inventors: Timothy Charles Hays, Troy; Thomas Lewis Richter, Sterling Heights; Dale Peter Holod, Livonia; Jerome Frank Kamyszek, Warren, all of Mich.

[73] Assignee: General Motors Corporation, Detroit, Mich.

[21] Appl. No.: 09/105,077

[22] Filed: Jun. 25, 1998

[51] Int. Cl.[6] .............................. B23B 39/20; B23Q 5/22
[52] U.S. Cl. ................................ 29/39; 483/901; 901/41; 901/47
[58] Field of Search .................................. 29/40, 39, 41, 29/740, 407; 453/901, 902; 901/41, 42, 44, 47

[56] References Cited

U.S. PATENT DOCUMENTS

| | | |
|---|---|---|
| 4,030,309 | 6/1977 | Mason . |
| 4,308,100 | 12/1981 | Albin ...................................... 414/146 |
| 4,741,078 | 5/1988 | Kimura ....................................... 29/39 |
| 4,754,415 | 6/1988 | George et al. ......................... 901/47 X |
| 4,773,815 | 9/1988 | Lemelson ................................ 26/26 A X |
| 4,774,751 | 10/1988 | Pryor ........................................ 29/407 |
| 5,323,528 | 6/1994 | Baker .................................... 29/740 X |

FOREIGN PATENT DOCUMENTS 292146  12/1990  Japan ..................................... 483/901

OTHER PUBLICATIONS

Quick Change Eoat Adapter, Automation Tooling Systems, Inc. (4 pages total).
Direct Drive Motors—The Compact Megatorque Motor JS Series–Motion & Control NSK (5 pages total).
Adept Three Robot—adept (1 page total).

*Primary Examiner*—William Briggs
*Attorney, Agent, or Firm*—Kathryn A. Marra

[57] ABSTRACT

An industrial robot has a mounting bracket and a servo motor secured to the mounting bracket for rotation relative thereto about a first axis offset from the vertical by 60°. A sensor plate is mounted on one end of the motor, a position sensor is mounted on the bracket and interacts with the sensor plate to sense the rotational home and overtravel positions of the motor. A tool changer is coaxially mounted on the other end of the motor and has means for mounting a turret for coaxial rotation by the motor. A turret having a plurality of circumferentially-spaced tools is mounted on the tool changer for operation on a second axis offset 60° from the first axis, such that each tool is rotatable about the first axis to a vertical working position. A video camera is mounted on the mounting bracket in a position to view the working position, and a controller, including a vision processor for interpreting the output of the video camera, controls the robot and the motor to position a preselected tool in a location to perform an operation on a workpiece. The tool changer releasably mounts the turret to enable quick mounting and release of a series of turrets each mounting different tools.

3 Claims, 6 Drawing Sheets

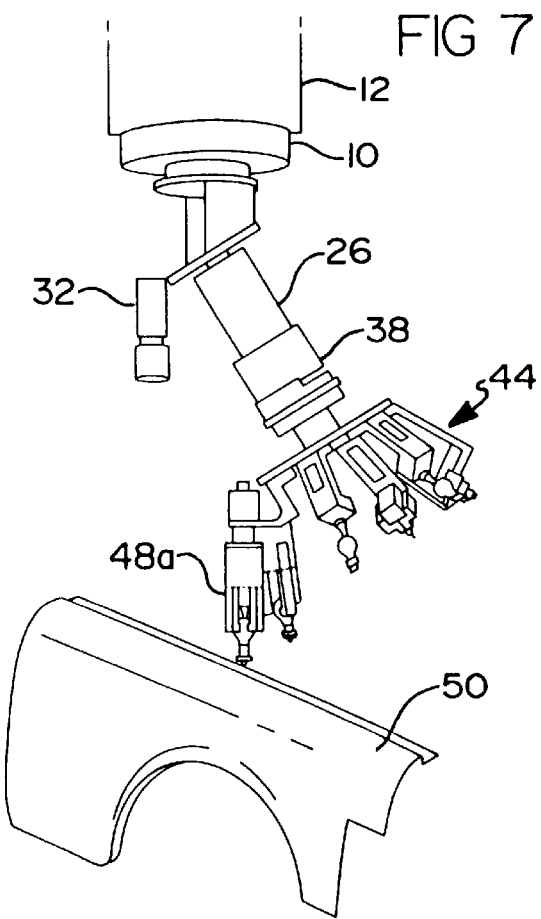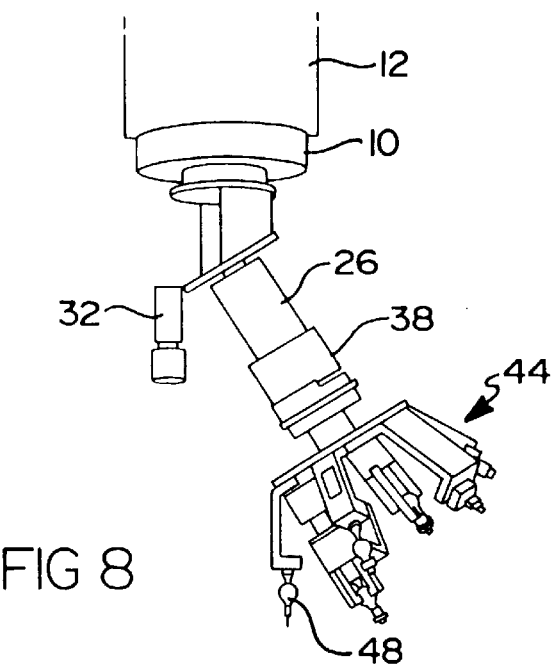

PROGRAMMABLE VISION-GUIDED ROBOTIC TURRET-MOUNTED TOOLS

BACKGROUND OF THE INVENTION

This invention relates generally to industrial robots and, more particularly, to vision-guided industrial robot which is programmable to sequentially position and utilize multiple tools carried on an indexible turret.

The current state of the art relating to turret mounted robotic-operated tools employs a drive system comprising an electric motor which drives the turret through a gear train and positions the tool heads on the turret by detents or by engaging locating pins in circumferentially spaced bushings. When a tool is rotated into position for use, it is aligned for engagement by the drive spindle. Such an arrangement is shown in U.S. Pat. No. 4,741,078. Because of the limited tool positioning, it does not permit ready adaptation to different part placement variations and presentations, or to process or product variations.

Thus, there is a need for an improved turret mounted, robotic operated tool which can be programmed to accommodate part, product and process variations.

SUMMARY OF THE INVENTION

It is therefore an object of this invention to provide an improved turret mounted, robotic operated tool which can be programmed to accommodate part, product and process variations.

In one aspect, this invention features an industrial robot having a mounting bracket and a servo motor secured to the mounting bracket for rotation relative thereto about a first axis offset from the vertical by a predetermined angle. A sensor plate is mounted on one end of the motor, a position sensor is mounted on the bracket and interacts with the sensor plate to sense the home and overtravel rotational position of the motor. A tool changer is coaxially mounted on the other end of the motor and has means for mounting a turret for coaxial rotation by the motor. A turret having a plurality of circumferentially-spaced tools is mounted on the adapter for operation on a second axis offset at a predetermined angle from the first axis, such that each tool is rotatable about the first axis to a vertical working position. A video camera is mounted on the mounting bracket in a position to view the working position, and a controller, including a vision processor for interpreting the output of the video camera, controls the robot and the motor to position a preselected tool in a location to perform an operation on a workpiece. Preferably, the tool changer releasably mounts the turret to enable quick mounting and release of a series of turrets each mounting different tools.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 5, 6, 7 and 8 are a sequence of perspective views of the robot of FIG. 1, shown approaching a tool turret, after securing the turret, operating on an automotive part, and raised from the part with the turret rotated to a position a new tool for use.

DETAILED DESCRIPTION OF A PREFERRED EMBODIMENT

Figure 1:
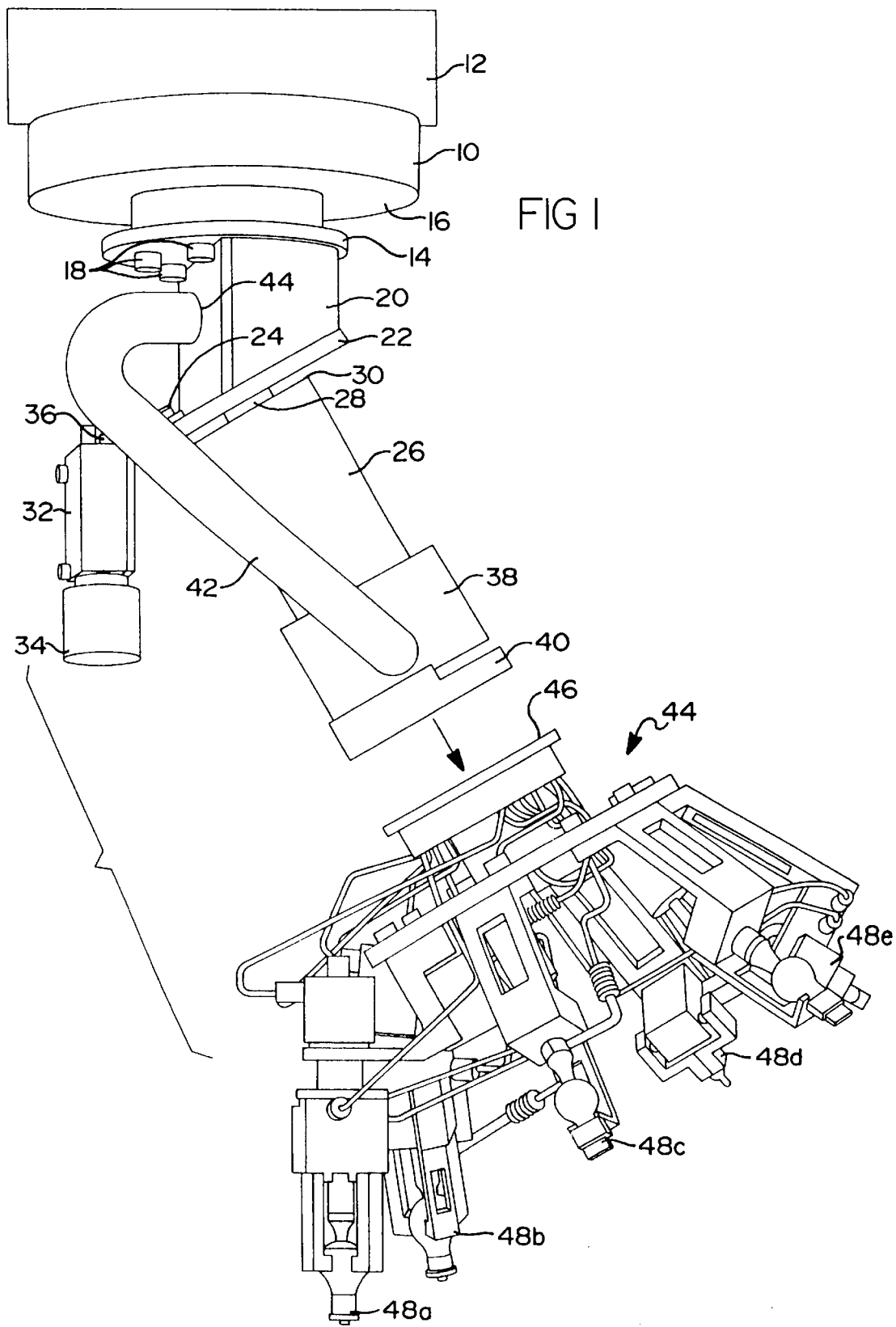
FIG. 1 is a front elevational view of an industrial robot incorporating a tool turret according to this invention.
Figure 2:
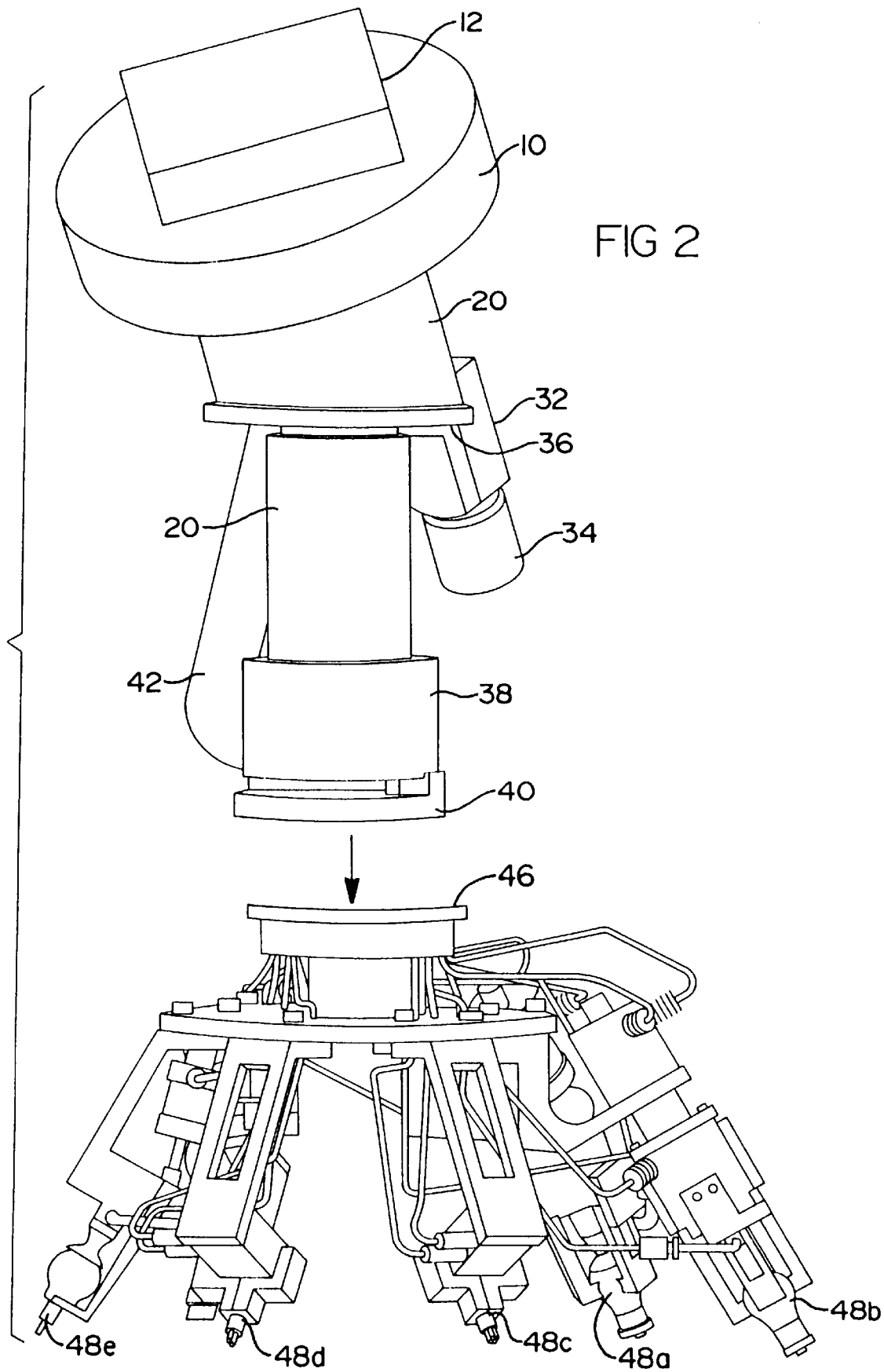
FIG. 2 is a side elevational view of the robot of FIG. 1.
Figure 3:
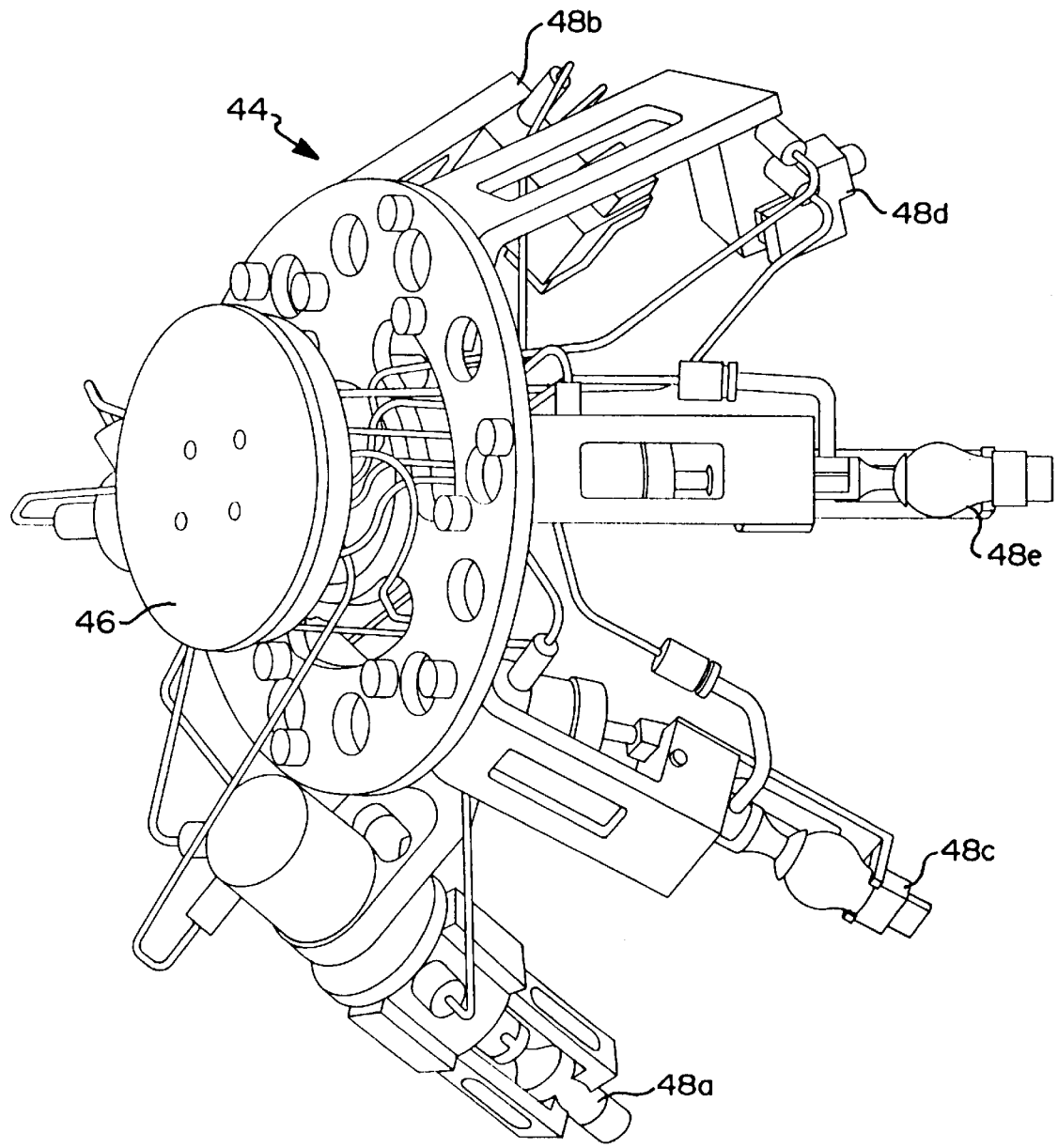
FIG. 3 is an enlarged perspective view of the tool turret of Rig. 1.
Figure 4:
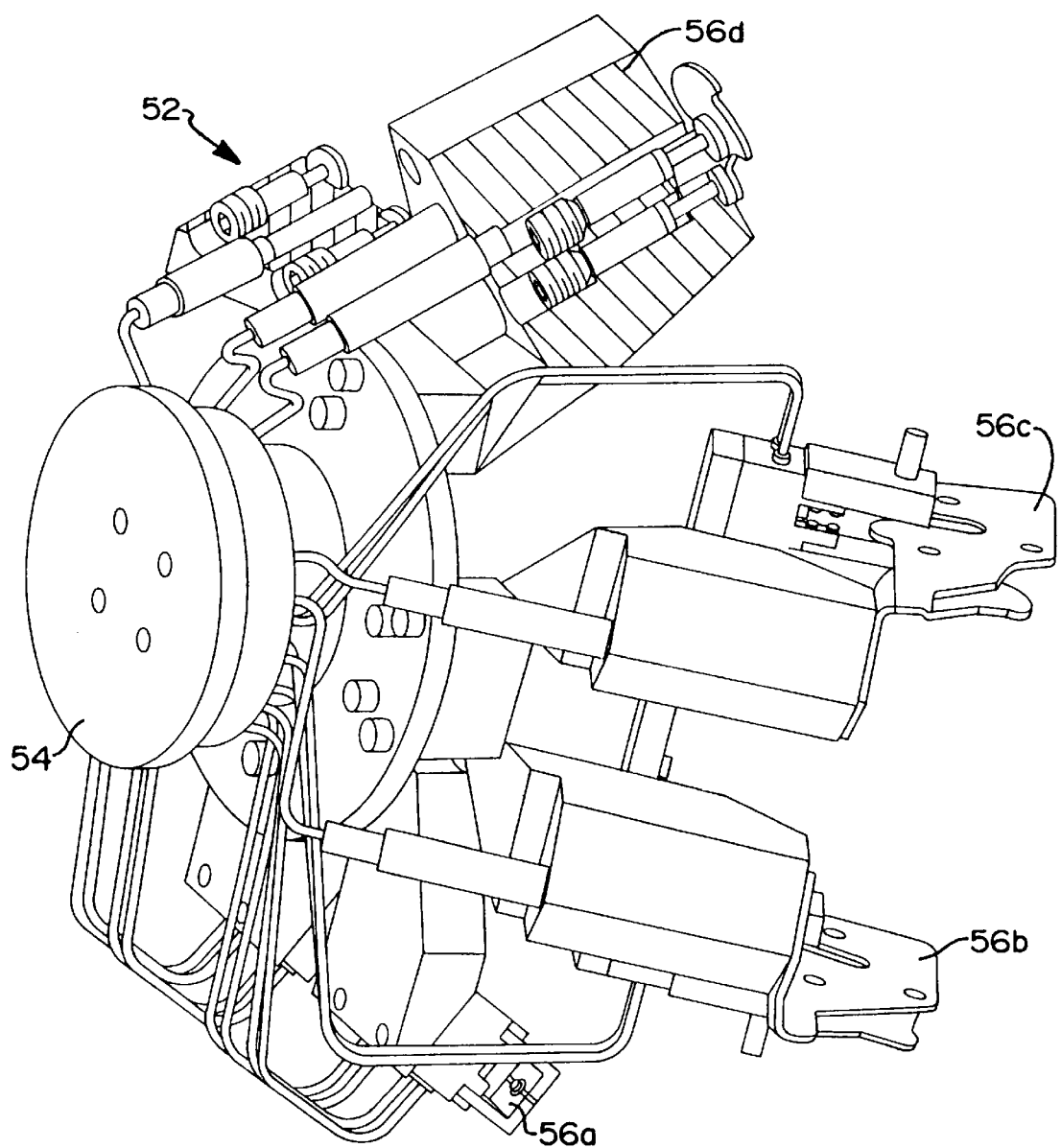
FIG. 4 is a view similar to FIG. 3, but of a different tool turret.

Referring initially to FIGS. 1–4, a robot 10 includes an electronic controller 12, shown schematically. Robot 10 can be any commercially-available industrial robot, such as made by Fanuc, Sony or others. Robot 10 includes a turret-mounting bracket 14 which is attached to its robot tool mounting face 16 by a plurality of bolts 18.

A turret collar 20 has a bottom mounting face 22. Three position sensors 24 (only one of which is shown) are spaced about the periphery of mounting face 22. An electric servomotor 26 extends from a motor plug 28 and mounts a motor position sensor plate 30. The rotational axis b of servomotor 26 is offset 60° from the vertical axis a. A CCD video camera 32 having a lens 34 is mounted by a bracket 36 to collar 20. At its bottom end, servomotor 26 mounts a quick-change mounting plate 38 and a tool changer 40. A supply tube 42 extends from a connector plate 44 to the quick change mounting plate 38 adjacent tool changer 40 and carries pneumatic and electrical supplies for use by the tools described below.

A turret 44 has a mounting plate 46 and mounts a plurality of circumferentially-spaced toolheads 48a, 48b, 48c, 48d, and 48e of any type normally used in industrial manufacturing operations. The robot is moved to a tooling turret storage location (FIG. 5) and engages tool changer 40 with the turret mounting plate 46 of turret 44 (FIG. 3), which it pneumatically locks onto in a known manner (FIG. 6). All electrical and pneumatic requirements for operating the tools are automatically connected through the interface of tool changer 40 and mounting plate 46. Toolheads mounting tools 48a, 48b, 48c, 48d and 48e are operationally angled at 60° to the axis b of servomotor 26 and turret 44, such that the operational axis c of the tool positioned for use (tool 48a in FIG. 6) is vertical. This double 60° axis offset allows the idle tools to be positioned out of the way so as to cause no interference with the work being performed, as illustrated in FIG. 7.

Figure 5:
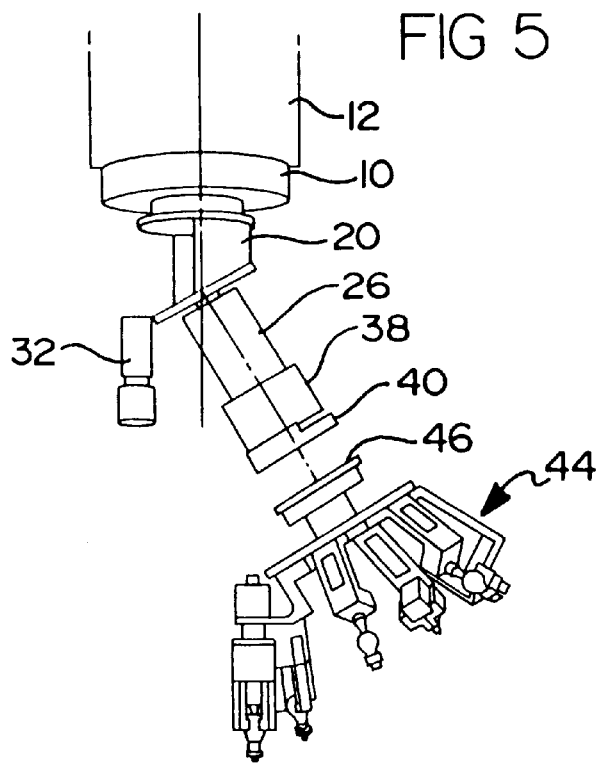
Figure 6:
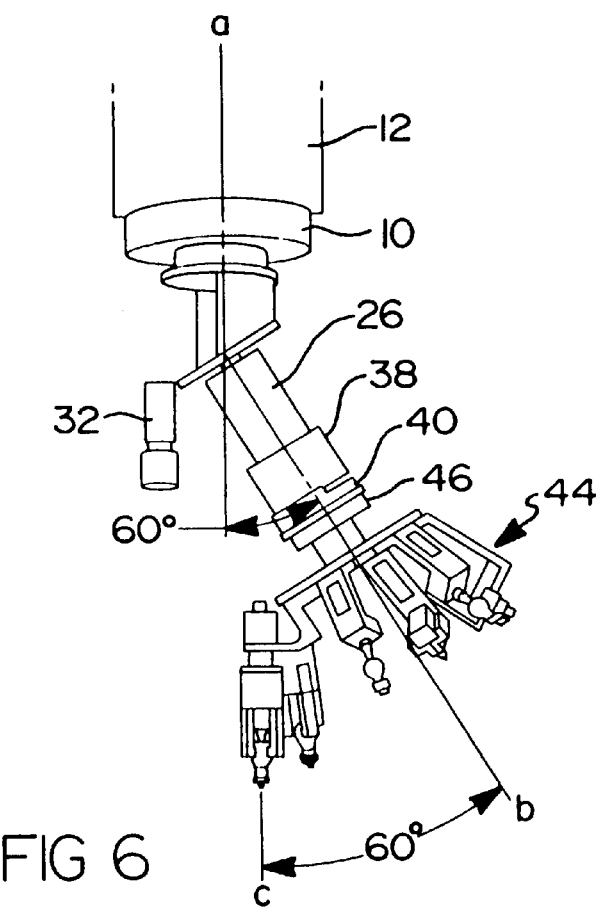

In operation, controller 12 directs robot 10 to move to a tooling storage location to pick up turret 44, as shown in FIGS. 5 and 6. Controller 12 then directs movement to a specified work location. Video camera 32 supplies information to the controllers video processor to verify such conditions as presence of part, part location and orientation.

A particular tool 48 is selected and indexed or rotated into position by servomotor 26. Turret 44 is precision-positioned by position sensors 24 which cooperate with position plate 30. The selected tool (here 48a) is lowered into working position, as monitored by video camera 32, which is positioned to view the area around toolhead 48a. The specified work task is then performed on a workpiece 50.

After the specified work task is completed, turret 44 is raised above the workpiece 50. If another task is commanded, turret 44 is rotated by servomotor 26 to position a new tool 44b into working position. Turret 44 is then again lowered or moved to a new location and lowered, depending on the location of the next task. Again video camera 32 monitors positioning. This sequence is repeated until all tasks commanded by controller 12 are completed. Robot 10 can then be removed to the tool storage area to exchange turret 44 with another turret 52 (FIG. 4) having a mounting plate 52 and containing different tools 54a, 54b, 54c and 54d.

Thus this invention provides a versatile industrial robot that can easily exchange tool turrets, can precision position the toolheads in the turret, is vision-guided into working position, positions non-working tools out of the way, and has tool operation disassociated from turret drive. The tool changer is designed for quick connect and disconnect so that a plurality of tool turrets can be utilized in quick succession, increasing the versatility and utility of the robot.

While only a preferred embodiment has been illustrated and described, obvious modifications thereof are contemplated within the scope of this invention and the following claims.

We claim:

1. An industrial robot having a turret mounting a plurality of circumferentially-spaced tools for indexing into and out of operative position, characterized by a mounting bracket, a motor secured to the mounting bracket for rotation relative thereto about a first axis offset from the vertical by a predetermined angle characterized by including, a sensor plate mounted on one end of the motor, a position sensor mounted on the bracket which interacts with the sensor plate to sense the motor's home position and overtravel limit rotational positions of the turret assembly, a tool change adaptor coaxially mounted on the other end of the motor and having means for mounting the turret for coaxial rotation by the motor, the turret mounting the tools for operation on a second axis offset at a said predetermined angle from the first axis, such that each tool is rotatable about the first axis to a vertical working position, a video camera mounted on the mounting bracket in a position to view the working position, and a controller, including a vision processor for interpreting the output of the video camera, for controlling the robot and the motor to position a preselected tool in a location to perform an operation on a workpiece.

2. The robot of claim 1, further characterized by the predetermined angle being about 60°.

3. The robot of claim 2, further characterized by the tool change adaptor releasably mounting the turret to enable quick connection to and disconnection from the turret, thereby enabling the robot to quickly utilize a series of turrets each mounting different tools.

* * * * *